United States Patent
Koshinaka

(10) Patent No.: US 8,595,004 B2
(45) Date of Patent: Nov. 26, 2013

(54) PRONUNCIATION VARIATION RULE EXTRACTION APPARATUS, PRONUNCIATION VARIATION RULE EXTRACTION METHOD, AND PRONUNCIATION VARIATION RULE EXTRACTION PROGRAM

(75) Inventor: Takafumi Koshinaka, Tokyo (JP)

(73) Assignee: NEC Corporation, Tokyo (JP)

( * ) Notice: Subject to any disclaimer, the term of this patent is extended or adjusted under 35 U.S.C. 154(b) by 496 days.

(21) Appl. No.: 12/747,961

(22) PCT Filed: Nov. 27, 2008

(86) PCT No.: PCT/JP2008/071500
§ 371 (c)(1),
(2), (4) Date: Jun. 14, 2010

(87) PCT Pub. No.: WO2009/078256
PCT Pub. Date: Jun. 25, 2009

(65) Prior Publication Data
US 2010/0268535 A1    Oct. 21, 2010

(30) Foreign Application Priority Data

Dec. 18, 2007    (JP) ................................. 2007-326132

(51) Int. Cl.
*G10L 15/00*    (2013.01)
(52) U.S. Cl.
USPC ............................. 704/236; 704/231; 704/254
(58) Field of Classification Search
USPC .................................................. 704/231–257
See application file for complete search history.

(56) References Cited

U.S. PATENT DOCUMENTS

| 4,718,094 | A | * | 1/1988 | Bahl et al. | 704/256 |
| 4,741,036 | A | * | 4/1988 | Bahl et al. | 704/256 |
| 4,829,577 | A | * | 5/1989 | Kuroda et al. | 704/244 |
| 5,233,681 | A | * | 8/1993 | Bahl et al. | 704/251 |

(Continued)

FOREIGN PATENT DOCUMENTS

| JP | H08123470 A | 5/1996 |
| JP | H10308887 A1 | 11/1998 |

OTHER PUBLICATIONS

A Spoken Access Approach for Chinese Text and Speech Information Retrieval Lee-Feng Chien, Hsin-Min Wang, Bo-Ren Bai, and Sun-Chein Lin Jasis, vol. 51, No. 4, Mar. 2000, 313-323.*

(Continued)

*Primary Examiner* — Pierre-Louis Desir
*Assistant Examiner* — Fariba Sirjani

(57) ABSTRACT

A problem to be solved is to robustly detect a pronunciation variation example and acquire a pronunciation variation rule having a high generalization property, with less effort. The problem can be solved by a pronunciation variation rule extraction apparatus including a speech data storage unit, a base form pronunciation storage unit, a sub word language model generation unit, a speech recognition unit, and a difference extraction unit. The speech data storage unit stores speech data. The base form pronunciation storage unit stores base form pronunciation data representing base form pronunciation of the speech data. The sub word language model generation unit generates a sub word language model from the base form pronunciation data. The speech recognition unit recognizes the speech data by using the sub word language model. The difference extraction unit extracts a difference between a recognition result outputted from the speech recognition unit and the base form pronunciation data by comparing the recognition result and the base form pronunciation data.

16 Claims, 9 Drawing Sheets

(56) References Cited

U.S. PATENT DOCUMENTS

| | | | |
|---|---|---|---|
| 5,293,451 A * | 3/1994 | Brown et al. | 704/245 |
| 5,293,584 A * | 3/1994 | Brown et al. | 704/277 |
| 5,596,679 A * | 1/1997 | Wang | 704/236 |
| 5,627,939 A * | 5/1997 | Huang et al. | 704/256 |
| 5,704,005 A * | 12/1997 | Iwamida | 704/254 |
| 5,710,866 A * | 1/1998 | Alleva et al. | 704/256.4 |
| 5,799,276 A * | 8/1998 | Komissarchik et al. | 704/251 |
| 5,819,220 A * | 10/1998 | Sarukkai et al. | 704/270.1 |
| 5,895,448 A * | 4/1999 | Vysotsky et al. | 704/270.1 |
| 6,021,384 A * | 2/2000 | Gorin et al. | 704/1 |
| 6,092,038 A * | 7/2000 | Kanevsky et al. | 704/9 |
| 6,167,377 A * | 12/2000 | Gillick et al. | 704/240 |
| 6,208,964 B1 * | 3/2001 | Sabourin | 704/244 |
| 6,226,611 B1 * | 5/2001 | Neumeyer et al. | 704/246 |
| 6,253,181 B1 * | 6/2001 | Junqua | 704/255 |
| 6,418,431 B1 * | 7/2002 | Mahajan et al. | 1/1 |
| 6,434,521 B1 * | 8/2002 | Barnard | 704/244 |
| 6,484,136 B1 * | 11/2002 | Kanevsky et al. | 704/9 |
| 6,490,555 B1 * | 12/2002 | Yegnanarayanan et al. | 704/231 |
| 6,622,121 B1 * | 9/2003 | Crepy et al. | 704/243 |
| 6,985,861 B2 * | 1/2006 | Van Thong et al. | 704/254 |
| 6,999,925 B2 * | 2/2006 | Fischer et al. | 704/243 |
| 7,089,188 B2 * | 8/2006 | Logan et al. | 704/270 |
| 7,103,544 B2 * | 9/2006 | Mahajan et al. | 704/240 |
| 7,181,398 B2 * | 2/2007 | Thong et al. | 704/254 |
| 7,251,600 B2 * | 7/2007 | Ju et al. | 704/257 |
| 7,266,495 B1 * | 9/2007 | Beaufays et al. | 704/236 |
| 7,299,178 B2 * | 11/2007 | Yoon et al. | 704/251 |
| 7,308,404 B2 * | 12/2007 | Venkataraman et al. | 704/255 |
| 7,395,205 B2 * | 7/2008 | Franz et al. | 704/256.3 |
| 7,433,819 B2 * | 10/2008 | Adams et al. | 704/251 |
| 7,447,635 B1 * | 11/2008 | Konopka et al. | 704/275 |
| 7,467,087 B1 * | 12/2008 | Gillick et al. | 704/260 |
| 7,584,102 B2 * | 9/2009 | Hwang et al. | 704/256 |
| 7,684,988 B2 * | 3/2010 | Barquilla | 704/256.1 |
| 7,711,561 B2 * | 5/2010 | Hogenhout et al. | 704/256.5 |
| 7,716,049 B2 * | 5/2010 | Tian | 704/251 |
| 7,756,708 B2 * | 7/2010 | Cohen et al. | 704/244 |
| 7,778,948 B2 * | 8/2010 | Johnson et al. | 706/45 |
| 7,797,152 B1 * | 9/2010 | Waite et al. | 704/9 |
| 7,848,926 B2 * | 12/2010 | Goto et al. | 704/251 |
| 7,856,351 B2 * | 12/2010 | Yaman et al. | 704/9 |
| 7,983,914 B2 * | 7/2011 | Eckhart et al. | 704/254 |
| 8,036,893 B2 * | 10/2011 | Reich | 704/257 |
| 8,041,566 B2 * | 10/2011 | Peters et al. | 704/254 |
| 8,073,693 B2 * | 12/2011 | Ljolje et al. | 704/254 |
| 8,077,983 B2 * | 12/2011 | Qiu et al. | 382/229 |
| 8,095,365 B2 * | 1/2012 | Conkie et al. | 704/260 |
| 8,200,490 B2 * | 6/2012 | Choi et al. | 704/252 |
| 8,447,608 B1 * | 5/2013 | Chang et al. | 704/257 |
| 2002/0087317 A1 * | 7/2002 | Lee et al. | 704/257 |
| 2002/0111805 A1 * | 8/2002 | Goronzy et al. | 704/250 |
| 2002/0111806 A1 * | 8/2002 | Franz et al. | 704/255 |
| 2002/0156627 A1 * | 10/2002 | Itoh et al. | 704/254 |
| 2003/0191626 A1 * | 10/2003 | Al-Onaizan et al. | 704/8 |
| 2004/0015356 A1 * | 1/2004 | Nakamura et al. | 704/250 |
| 2004/0088162 A1 * | 5/2004 | He et al. | 704/235 |
| 2004/0117181 A1 * | 6/2004 | Morii et al. | 704/234 |
| 2004/0243412 A1 * | 12/2004 | Gupta et al. | 704/254 |
| 2005/0180547 A1 * | 8/2005 | Pascovici | 379/88.01 |
| 2005/0182628 A1 * | 8/2005 | Choi | 704/252 |
| 2005/0267757 A1 * | 12/2005 | Iso-Sipila et al. | 704/260 |
| 2006/0069562 A1 * | 3/2006 | Adams et al. | 704/251 |
| 2006/0085187 A1 * | 4/2006 | Barquilla | 704/243 |
| 2007/0038453 A1 * | 2/2007 | Yamamoto et al. | 704/257 |
| 2007/0055514 A1 * | 3/2007 | Beattie et al. | 704/235 |
| 2007/0100618 A1 * | 5/2007 | Lee et al. | 704/238 |
| 2007/0124147 A1 * | 5/2007 | Gopinath et al. | 704/257 |
| 2007/0185713 A1 * | 8/2007 | Jeong et al. | 704/254 |
| 2007/0233487 A1 * | 10/2007 | Cohen et al. | 704/255 |
| 2008/0177545 A1 * | 7/2008 | Li et al. | 704/255 |
| 2008/0221890 A1 * | 9/2008 | Kurata et al. | 704/251 |
| 2009/0030691 A1 * | 1/2009 | Cerra et al. | 704/255 |
| 2009/0119105 A1 * | 5/2009 | Kim et al. | 704/244 |
| 2009/0271195 A1 * | 10/2009 | Kitade et al. | 704/239 |
| 2009/0313019 A1 * | 12/2009 | Kato et al. | 704/254 |
| 2010/0023329 A1 * | 1/2010 | Onishi | 704/244 |
| 2010/0057457 A1 * | 3/2010 | Ogata et al. | 704/235 |
| 2010/0312550 A1 * | 12/2010 | Lee | 704/10 |
| 2011/0224985 A1 * | 9/2011 | Hanazawa et al. | 704/244 |
| 2012/0035915 A1 * | 2/2012 | Kitade et al. | 704/9 |
| 2012/0084077 A1 * | 4/2012 | Elshishiny et al. | 704/10 |
| 2012/0130706 A1 * | 5/2012 | Qiu et al. | 704/9 |

OTHER PUBLICATIONS

Srinivasan S., Petkovic D.: "Phonetic Confusion Matrix Based Spoken Document Retrieval", Proceedings of SIGIR'2000.*

A Multimedia Retrieval System for Retrieving. Chinese Text and Speech Documents. Yue-Shi Lee and Hsin-Hsi Chen. Department of Computer Science and Information Engineering National Taiwan University, 1999.*

R Tsutsumi et al., "Lecture Speech Recognition Using Pronunciation Variant Modeling", The transactions of the Institute of Electronics, Information and Communication Engineers J89-D(2), 2006, pp. 305-313.

Y. Akita et al., "Generalized Statistical Modeling of Pronunciation Variations for Spontaneous Speech Recognition", The transactions of the Institute of Electronics, Information and Communication Engineers J88-D2(9), 2005, pp. 1780-1789.

J. Ogata et al, "A Study on Spontaneous Speech Recognition Incorporating Pronunciation Variation and Acoustic Error Tendency", Lecture Paper Collection of 2003 Spring Meeting of Acoustical Society of Japan, Mar. 2003. pp. 9-10.

J. Ogata et al, "Dynamic Pronunciation Modeling for Spontaneous Speech Recognition", Lecture Paper Collection of 2004 Spring meeting of Acoustical Society of Japan, Mar. 2004, pp. 203-204.

Y. Onishi, "Pronunciation Variation Extraction and Dictionary Expansion considering Speakerwise Deviation of Recognition Error Statistics", Lecture Paper Collection of 2007 spring meeting of Acoustical Society of Japan, Mar. 2007, pp. 65-66.

Hajime Tsukada, "Omomi Tsuki Yugen Jotai Transducer no Jido Gakushu to Hatsuon Henkei no Model-ka", The Transactions of the Institute of Electronics, Information and Communication Engineers D-II, Nov. 25, 2000, vol. J83-D-II, No. 11, pp. 2457 to 2464 attached with English abstract translation of Written Opinion.

T. Fukada and Y. Sagisaka,"Automatic Generation of Pronunciation Dictionary Based on Pronunciation Networks", The Institute of Electronics, Information and Communication Engineers, D-II, Oct. 25, 1997, vol. J80-D-II, No. 10, p. 2626-2635 attached with English abstract.

PCT ISA237 for PCT/JP2008/071500 dated Jul. 20, 2010 attached with English translation.

International Search Report for PCT Application No. PCT/JP2008/071500 mailed on Jan. 13, 2009.

* cited by examiner

Fig. 5

| h | w | P(w\|h) | REMARK |
|---|---|---|---|
| φ | MI | 1.0 | UNIGRAM AT BEGINNING OF SENTENCE |
| φ MI | NA | 1.0 | BIGRAM AT BEGINNING OF SENTENCE |
| MI NA | SA | 1.0 | |
| NA SA | N | 1.0 | |
| N # | KO | 1.0 | |
| SA N | KO | 0.5 | |
| SA N | # | 0.5 | BRANCH DEPENDING ON EXISTENCE OR ABSENCE OF INTER-WORD PAUSE |
| N KO | N | 1.0 | |
| # KO | N | 1.0 | |
| KO N | NI | 1.0 | |
| N NI | CHI | 1.0 | |
| NI CHI | WA | 1.0 | |

Fig. 6

| LANGUAGE MODEL WEIGHT | RECOGNITION RESULT |
|---|---|
| 10.0 | # MI NA SA N # KO N NI CHI WA # |
| ⋮ | ⋮ |
| 2.0 | # MI NA SA N # KO NI CHI WA # |
| 1.0 | # MI N SA N # KO NI TU WA # |
| 0.5 | # MI NA SA # GO NU ZU BA # |

Fig. 7

| BASE FORM | SURFACE FORM | LANGUAGE MODEL WEIGHT | REMARK |
|---|---|---|---|
| MI NA SA N | MI NA SA N | 10.0 | IDENTICAL DEFORMATION |
| KO N NI CHI WA | KO N NI CHI WA | 10.0 | IDENTICAL DEFORMATION |
| MI NA SA N | MI NA SA N | 2.0 | IDENTICAL DEFORMATION |
| KO N NI CHI WA | KO NI CHI WA | 2.0 | DELETION "N" |
| MI NA SA N | MI N SA N | 1.0 | REPLACEMENT "NA → N" |
| KO N NI CHI WA | KO NI TU WA | 1.0 | REPLACEMENT "CHI → TU" |
| ⋮ | ⋮ | ⋮ | ⋮ |

PRONUNCIATION VARIATION RULE EXTRACTION APPARATUS, PRONUNCIATION VARIATION RULE EXTRACTION METHOD, AND PRONUNCIATION VARIATION RULE EXTRACTION PROGRAM

This application is the National Phase of PCT/JP2008/071500, filed Nov. 27, 2008, which is based upon and claims the benefit of priority from Japanese Patent Application No. 2007-326132, filed on Dec. 18, 2007, the disclosure of which is incorporated herein its entirely by reference.

TECHNICAL FIELD

The present invention relates to a pronunciation variation rule extraction apparatus, a pronunciation variation rule extraction method, and a pronunciation variation rule extraction program, and more particularly relates to a pronunciation variation rule extraction apparatus, a pronunciation variation rule extraction method, and a pronunciation variation rule extraction program, which can extract a rule of pronunciation variations that often appear in spontaneous speech, from speech data attached with a corresponding transcription text, or the like.

BACKGROUND ART

[Tsutsumi, Katoh, Kosaka and Kohda, "Lecture Speech Recognition Using Pronunciation Variant Modeling", The transactions of the Institute of Electronics, Information and Communication Engineers J89-D (2), 305-313, 2006], and [Akita and Kawahara, "Generalized Statistical Modeling of Pronunciation Variations for Spontaneous Speech Recognition", The transactions of the Institute of Electronics, Information and Communication Engineers J88-D2 (9), 1780-1789, 2005] describe an example of a pronunciation variation rule extraction apparatus. As shown in FIG. 1, this pronunciation variation rule extraction apparatus 200 is configured to include base form pronunciation storage means 201, surface form pronunciation storage means 202, difference extraction means 203 and pronunciation variation counter means 209.

The pronunciation variation rule extraction apparatus 200 having such a configuration is operated as follows. That is, the difference extraction unit 203 extracts transcription texts from the base form pronunciation storage unit 201 and the surface form pronunciation storage unit 202, respectively, and extracts differences, namely, different portions.

Here, the base form pronunciation storage unit 201 and the surface form pronunciation storage unit 202 store the transcription texts as results of transcription of pronunciation content of speech data of a long time. More specifically, the base form pronunciation storage unit 201 stores the following transcription text, for example.

"Sono youna shujutsu wo hobo mainichi okonai mashi ta (in Hiragana)"

The surface form pronunciation storage unit 202 stores in a format corresponding to the transcription text stored in the base form pronunciation storage unit 201, for example, the following transcription text.

"Sono youna shijitsu wo hobo mainichi okonai mashi ta (in Hiragana)"

The base form pronunciation storage 201 stores a base form pronunciation of the speech data serving as original, namely, a proper pronunciation to be observed when proper pronunciation is carried out, as the transcription text. On the other hand, the surface form pronunciation storage 202 stores the transcription text in which, when the speech data is actually heard by a human, the pronunciation as heard is strictly transcribed. In the above example, correspondingly to the base form pronunciations of ["shujutsu (in Hiragana)" (surgery)] and ["mainichi (in Hiragana)" (every day)], the surface form pronunciations of ["shijitsu (in Hiragana)"] and ["mainchi (in Hiragana)"] are stored respectively.

The difference extractor 203 compares the base form transcription text and the surface form transcription text, and extracts letter string pairs of different portions. In the above example, a pair of ["shujutsu (in Hiragana)"] and ["shijitsu (in Hiragana)"] and a pair of ["mainichi (in Hiragana)"] and ["mainchi (in Hiragana)"] are extracted. Hereafter, these pairs are referred to as pronunciation variation examples. A pronunciation variation example in which a base form pronunciation and a surface form pronunciation are same, namely, there is no deformation is especially referred to as an identical pronunciation variation.

The pronunciation variation counter unit 204 receives the pronunciation variation examples from the difference extraction unit 203, classifies them with respect to the same base form and the same surface form, and counts observation number such that the identical pronunciation variation is included. Moreover, the counted results are normalized and converted into probability values. For example, in the above example, it is supposed that there are ["mainichi (in Hiragana)" (identical deformation)], ["mainchi (in Hiragana)"], ["maichi (in Hiragana)"], and ["man-ichi (in Hiragana)"] as surface form pronunciations corresponding to the base form pronunciation ["mainichi (in Hiragana)"] and that they are observed 966 times, 112 times, 13 times and 2 times, respectively. Since observation number of the base form pronunciation ["mainichi (in Hiragana)"] is 966+112+13+2=1093, the converted probability values are respectively as follows:

"mainichi (in Hiragana)"→"mainichi (in Hiragana)"
0.884 (966/1093);
"mainichi (in Hiragana)"→"mainchi (in Hiragana)"
0.102 (112/1093);
"mainichi (in Hiragana)"→"maichi (in Hiragana)"
0.012 (13/1093); and
"mainichi (in Hiragana)"→"man-ichi (in Hiragana)"
0.002 (2/1093). These results can be interpreted as a probability rule with regard to appearance tendencies of the surface form pronunciations corresponding to the base form pronunciation ["mainichi (in Hiragana)"]. The pronunciation variation counter unit 204 outputs the above results as a pronunciation variation rule.

Although the base form pronunciation and the surface form pronunciation are dealt with for word unit in the above example, it should be noted that they can be dealt with for another unit, for example, series of phoneme (minimum unit configuring speech, such as vowels and consonants, or the like) having a predetermined length. Also, when the probability values are calculated, there may be carried out a proper smoothing operation, for example, a neglect of a minor pronunciation variation of which observation number is smaller than a predetermined value.

[Ogata and Ariki, "Study of Spontaneous Speech Recognition in Which Pronunciation Deformation and Acoustic Error Trend Are Considered", Lecture Paper Collection of 2003 Spring Meeting of Acoustical Society of Japan, pp. 9-10, March 2003] and [Ogata, Goto and Asanao, "Study of Dynamic Pronunciation Modeling Method for Spontaneous Speech Recognition", Lecture Paper Collection of 2004 Spring meeting of Acoustical Society of Japan, pp. 203-204, March 2004] describe another example of a pronunciation variation rule extraction apparatus. As shown in FIG. 2, this pronunciation variation rule extraction apparatus 300 is configured to include a speech data storage unit 301, a base form pronunciation storage unit 302, a syllable dictionary storage unit 303, an acoustic model storage unit 304, a speech recognition unit 305, a difference extraction unit 306 and a pronunciation variation counter unit 307.

The pronunciation variation rule extraction apparatus 300 having such a configuration is operated as follows. That is, the speech recognition unit 305 uses a dictionary stored in the syllable dictionary storage unit 303 and acoustic models stored in the acoustic model storage unit 304 to perform a known continuous syllable recognition process on speech data stored in the speech data storage unit 301, and then outputs a syllable series as the recognition result.

Here, in a case of Japanese, the dictionary stored in the syllable dictionary storage unit 303 is a list that records various syllables, such as "a, i, u, e, o, ka, ki, ku, ke, ko, (in Hiragana)", and is provided for each syllable with a pointer to the acoustic model such that, acoustic feature of the syllable can be referred. Even in a case of another language, it is possible to configure the dictionary by defining a proper unit which corresponds to the language. Also, the acoustic model stored in the acoustic model storage unit 304 is a model in which acoustic feature with regard to predetermined recognition unit, namely, syllable, phoneme or the like is described in accordance with a method such as a known hidden Markov model.

The difference extraction unit 306 receives: the recognition result from the speech recognition unit 305; and transcription text from the base form pronunciation storage unit 302, respectively, and extracts differences between them, namely, different portions. Here, the transcription text stored in the base form pronunciation storage unit 302 is similar to the transcription text stored in the base form pronunciation storage unit 201 in FIG. 1 and correlated to the speech data stored in the speech data storage unit 301. Namely, stored as the transcription text is a proper pronunciation to be observed when the content of the speech data in the speech data storage unit 301 is properly pronounced. The pronunciation variation counter unit 307, through an operation similar to that of the pronunciation variation counter unit 204 in FIG. 1, receives pronunciation variation examples from the difference extractor 306 and outputs a pronunciation variation rule.

[Onishi, "Extraction of Phonation Deformation and Expansion of Recognition Dictionary in Consideration of Speaker Oriented Property of Recognition Error", Lecture Paper Collection of 2007 spring meeting of Acoustical Society of Japan, pp. 65-66, March 2007] describes still another example of a pronunciation variation rule extraction apparatus. As shown in FIG. 3, this pronunciation variation rule extraction apparatus 400 is configured to include a speech data storage unit 401, a base form pronunciation storage unit 402, a word language model/dictionary storage unit 403, an acoustic model storage unit 404, a speech recognition unit 405, a difference extraction unit 406 and a pronunciation variation counter unit 407.

The pronunciation variation rule extraction apparatus 400 having such a configuration is operated as follows. That is, the speech recognition unit 405 uses a language model and a dictionary stored in the word language model/dictionary storage unit 403 and acoustic models stored in the acoustic model storage 404 to perform a known continuous word recognition process on speech data stored in the speech data storage unit 401, and then outputs word series as the recognition result.

Here, a dictionary and a language model that are installed in a typical large vocabulary speech recognition system can be used as the dictionary and the language model that are stored in the word language model/dictionary storage unit 403. The dictionary includes several tens of thousands of words each of which is provided with a pronunciation thereof and a pointer to an acoustic model for referring acoustic features. The language model is based on a known n-gram model and is a model in which, when an array of n−1 words is given, probabilities of appearances of words as the next word are defined.

The acoustic model stored in the acoustic model storage unit 404 is, as same as the acoustic model stored in the acoustic model storage unit 304 in FIG. 2, a model in which acoustic feature with regard to predetermined recognition unit, namely, syllable, phoneme or the like is described in accordance with a method such as a known hidden Markov model.

The difference extraction unit 406, through an operation similar to that of the difference extraction unit 306 in FIG. 2, receives: recognition result from the speech recognition unit 405; and transcription text from the base form pronunciation storage unit 402, respectively, and extracts differences between them, namely, different portions. Here, the transcription text stored in the base form pronunciation storage unit 402 is similar to that of the base form pronunciation storage unit 302 in FIG. 2, and is required to be correlated to the speech data stored in the speech data storage unit 401. The pronunciation variation counter unit 407 receives, through an operation similar to that of the pronunciation variation counter unit 204 in FIG. 1 or the pronunciation variation counter unit 307 in FIG. 2, pronunciation variation examples from the difference extractor unit 406 and outputs a pronunciation variation rule.

A first problem with respect to the pronunciation variation rule extraction apparatuses 200, 300 and 400 described in those five documents lies in a fact that a large amount of effort is required to obtain the pronunciation variation rule and the pronunciation variation examples based on which the rule is obtained. The reason is that base form pronunciations and surface form pronunciations corresponding thereto are required to be prepared in a large amount. In order to acquire a pronunciation variation rule of high acceptability, in the case of the pronunciation variation rule extraction apparatus 200 in FIG. 1, the base form pronunciations to be stored in the base form pronunciation storage 201 and the surface form pronunciations to be stored in the surface form pronunciation storage 202 are required to be prepared in advance by performing a large number of transcription of the speech data. However, the preparation of the base form pronunciations and the surface form pronunciations, in particular the preparation of the latter, requires long time and large effort because an expert familiar with the listening of speech is required to carefully listen a speech and to transcribe surface form pronunciation that is ambiguous and has a difficulty in judging, as a letter string.

A second problem is a difficulty in obtaining a pronunciation variation rule having a high generalization property. This is because it is difficult to obtain accurate pronunciation variation example from speech data of spontaneous speech. For example, as for the pronunciation variation rule extraction apparatus 200 in FIG. 1, the surface form pronunciations are transcribed by experts. Here, in general, many experts share the work in order to obtain the large quantity of transcriptions. However, since the pronunciation of the speech is essentially ambiguous, the subjectivities of the experts are greatly included in the transcriptions, and then discrepancies are generated in the transcription results. In the pronunciation variation rule extraction apparatus 300 in FIG. 2, the speech recognition unit can automatically obtain the surface form pronunciations based on a unified standard. However, under the current technical level of the speech recognition, it is very difficult to accurately carry out the continuous syllable recognition process for determining the array of syllables without linguistic background knowledge. For example, when the continuous syllable recognition is performed on a phonation of ["Hiroshima (in Hiragana)"], the result far from the actual pronunciation variation is often obtained such as ["kerusema (in Hiragana)"] or ["karurika (in Hiragana)"]. That is, even if the continuous syllable recognition is applied, only the letter string that is random and poor in usefulness is obtained.

Also in the pronunciation variation rule extraction apparatus 400 in FIG. 3, although the background knowledge such as the word dictionary and the language model is available, the problem of the inaccuracy of the speech recognition still remains similarly to the pronunciation variation rule extraction apparatus 300 in FIG. 2. Moreover, in the pronunciation variation rule extraction apparatus 400 in FIG. 3, since the word dictionary and the language model act as linguistic constraints in the speech recognition process, the obtained pronunciation variation examples are influenced by the word dictionary and the language mode. Thus, in general, the pronunciation variation examples that differ from the actual pronunciation variation phenomenon are obtained. For example, the phenomenon in which ["sentakuki (in Hiragana)" (laundry machine)] is changed to ["sentakki (in Hiragana)"] or ["shokupan (in Hiragana)" (pullman loaf)] is changed to ["shoppan (in Hiragana)"] is found in general. However, in the pronunciation variation rule extraction apparatus 400 in FIG. 3, the speech recognition result is only obtained as the combination of words included in the word dictionary. Thus, there is no guarantee that the recognition result corresponding to the pronunciation ["sentakki (in Hiragana)"] is obtained.

DISCLOSURE OF INVENTION

An object of the present invention is to robustly detect a pronunciation variation example and acquire a pronunciation variation rule having a high generalization property, with less effort.

In a first aspect of the present invention, a pronunciation variation rule extraction apparatus includes a speech data storage unit, a base form pronunciation storage unit, a sub word language model generation unit, a speech recognition unit, and a difference extraction unit. The speech data storage unit stores speech data. The base form pronunciation storage unit stores base form pronunciation data representing base form pronunciation of the speech data. The sub word language model generation unit generates a sub word language model from the base form pronunciation data. The speech recognition unit recognizes the speech data by using the sub word language model. The difference extraction unit extracts a difference between a recognition result outputted from the speech recognition unit and the base form pronunciation data by comparing the recognition result and the base form pronunciation data.

In a second aspect of the present invention, a pronunciation variation rule extraction method includes storing, generating, recognizing, and extracting. In the storing, base form pronunciation data representing base form pronunciation of speech data is stored. In the generating, a sub word language model is generated from the base form pronunciation data. In the recognizing, the speech data is recognized by using the sub word language model. In the extracting, a difference between a recognition result of the recognizing and the base form pronunciation data are extracted by comparing the recognition result and the base form pronunciation data.

In a third aspect of the present invention, a pronunciation variation rule extraction program causes a computer to function as a speech data storage unit, a base form pronunciation storage unit, a sub word language model generation unit, a speech recognition unit, and a difference extraction unit. The speech data storage unit stores speech data. The base form pronunciation storage device stores base form pronunciation data representing base form pronunciation of the speech data. The sub word language model generation unit generates a sub word language model from the base form pronunciation data. The speech recognition unit recognizes the speech data by using the sub word language model. The difference extraction unit extracts a difference between a recognition result outputted from the speech recognition unit and the base form pronunciation data by comparing the recognition result and the base form pronunciation data. The program is stored in a computer-readable recording medium and is read by the computer from the recording medium.

As an advantage of the present invention, a pronunciation variation rule can be obtained which is accurate and has a high generalization property. The reason is as follows. A speech recognition is basically used of which unit is constraint-free sub word. By carrying out the speech recognition while imposing a linguistic constraint of base form pronunciation corresponding to speech data at arbitrary intensity, without depending on differences among respective pieces of speech data, pronunciation variations can be extracted which commonly appear in many pieces of speech data. Furthermore, discrepancies due to subjective judgment, which occur in a manual transcription, are not generated.

BRIEF DESCRIPTION OF DRAWINGS

FIG. 5 illustrates a specific example of operation according to the first exemplary embodiment of the present invention;

FIG. 6 illustrates a specific example of operation according to the first exemplary embodiment of the present invention;

FIG. 7 illustrates a specific example of operation according to the first exemplary embodiment of the present invention;

BEST MODE FOR CARRYING OUT THE INVENTION

Figure 4:
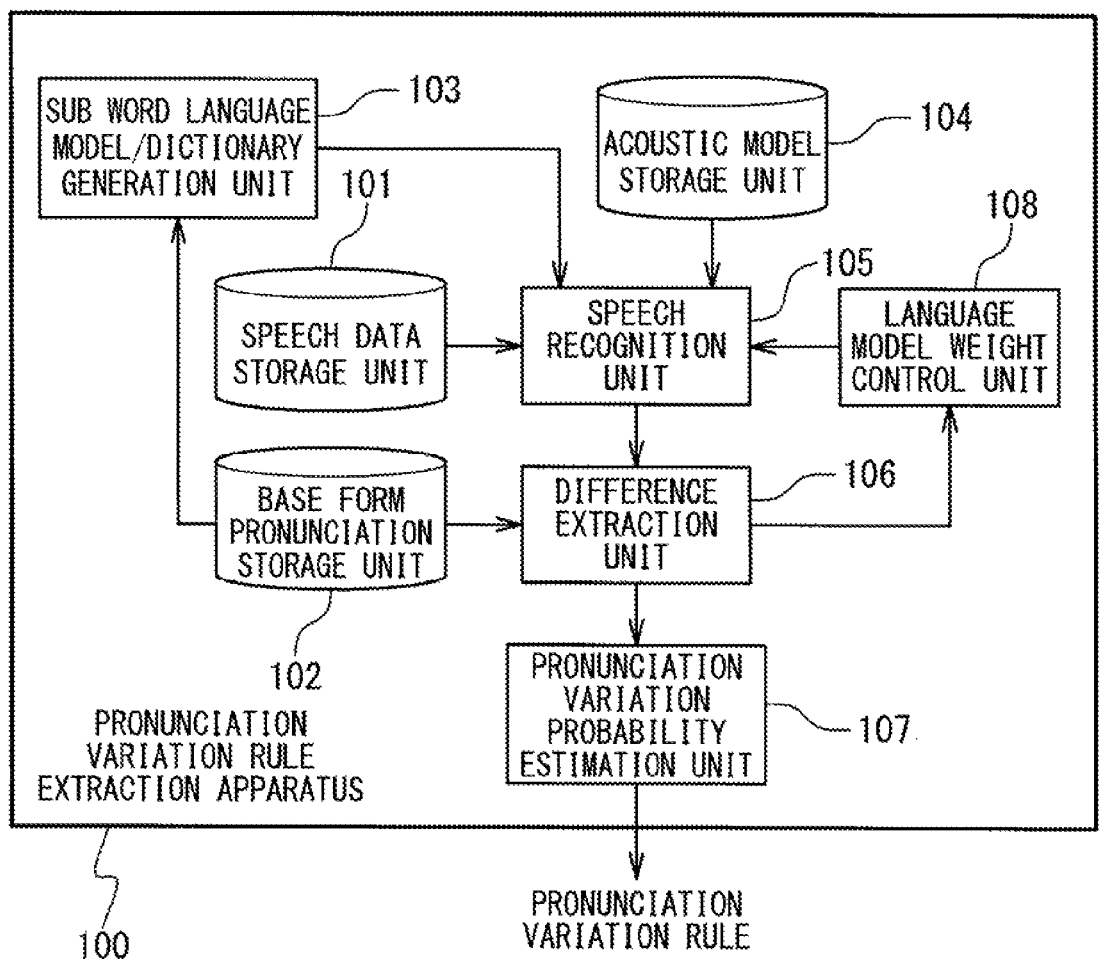
FIG. 4 is a block diagram showing a configuration according to a first exemplary embodiment of the present invention.

An exemplary embodiment of the present invention will be described below in detail with reference to the drawings. With reference to FIG. 4, a pronunciation variation rule extraction apparatus 100 according to a first exemplary embodiment of the present invention includes a speech data storage unit 101, a base form pronunciation storage unit 102, a sub word language model/dictionary generation unit 103, an acoustic model storage unit 104, a speech recognition unit 105, a difference extraction unit 106, a pronunciation variation probability estimation unit 107 and a language model weight control unit 108.

The speech data storage unit 101 stores many pieces of speech data which are supposed to include pronunciation variation examples. The base form pronunciation storage unit 102 stores transcription texts of the speech data stored in the speech data storage unit 101. Here, the transcription text is text data in which the pronunciation content of the speech data is transcribed in a base form, and the text data is represented by series of Hiragana, Katakana, or arbitrary phonetic notation. The following indicates an example of the transcription text represented by Hiragana.

"Minasan konnichiwa (in Hiragana)"
Since this is a transcription representing pronunciation, ["konnichiha (in Hiragana)"] is described as ["konnichiwa (in Hiragana)"].

The acoustic model storage unit 104 stores an acoustic models that is required when the speech recognition unit 105, which will be described later, carries out a speech recognition process. The acoustic models are models in which respective phonemes (vowels a, i, u, e, o, and consonants k, s, t, n, ... in the case of Japanese) are modeled based on the hidden Markov model.

The sub word language model/dictionary generation unit 103, by using the transcription text stored in the base form pronunciation storage unit 102, generates sub word language model/dictionary that is required when the speech recognition unit 105, which will be described later, carries out the speech recognition process. Here, the dictionary is configured such that, when sub words are, for example, syllables, each syllable of ["a, i, u, e, o, ka, ki, ku, ke, ko, ... (in Hiragana)"] is assumed to be one word. In order to achieve availability of acoustic feature of each word, namely, each syllable, a pointer from a word to an acoustic model is provided as ["a (in Hiragana)"→a], ["ka (in Hiragana)"→ka], ["sa (in Hiragana)"→sa], for example. It should be noted that the dictionary is not required to be generated together with the language model when the dictionary covers all syllables which can be generally included in speech data. In this case, such dictionary may be stored in a storage unit (not shown).

The sub word language model defines for each word as a sub word, based on the concept of the n-gram model which is widely used in speech recognition, a probability P(w|h) at which a word w appears after a history h. Specifically, for example, in a case of a model of n=3 (a trigram model), when syllables si–2 and si–1 appear in this order, a probability P(si|si–2, si–1) at which a syllable si subsequently appears is defined for various si–2, si–1 and si. Here, the sub word language model is generated by using the base form transcription text stored in the base form pronunciation storage unit 102 as learning data.

For example, a sub word language model that is generated by using one utterance of "Minasan konnichiwa (in Hiragana)" in the above example as learning data is shown in FIG. 5. It should be noted that the equal probability can be given with respect to a probability including history h which is not shown in FIG. 5 and that zero can be given as a probability which includes history h shown in FIG. 5 and is not shown in FIG. 5. In an "h" column in FIG. 5, φ indicates a null letter string and particularly means a beginning of sentence in this case. Also, # means a pause (silence) between the words, and a probability is shared equally between cases of existence and absence of the pausebetween the words. As mentioned above, a sub word language model, which is learned from a transcription text of short unit such as one utterance, accepts the learned transcription text at a very high probability (a probability is 1 in many cases) and refuses almost all texts other than the text.

It should be noted that the sub word language model is generated for one utterance as a unit. However, the first exemplary embodiment is not limited to this way of selecting unit. Then, several utterances or one to several numbers of words can be used as one unit. Although the unit of words configuring the sub word language model/dictionary is syllable in this case, the sub word language model/dictionary can be generated by using unit generally called as sub word, namely, syllable, demi-syllable, mora, phoneme or the like.

The language model weight control unit 108 determines a weight value of the sub word language model at least once and sends it to the speech recognition unit 105. When the determination is performed only once, for example, a constant that is experimentally determined in advance may be used. Also, when the determination is performed a plurality of times, a plurality of constants that are experimentally determined in advance may be sequentially selected, or a predetermined value may be sequentially added to or subtracted from a predetermined initial value. Here, the weight value of the sub word language model is a positive value in general and is a parameter defining how extent is a score considered as important which is calculated from the sub word language model when the speech recognition unit 105, which will be described later, carries out the speech recognition process by referring to the acoustic models and the sub word language model/dictionary.

The speech recognition unit 105 receives: the acoustic models from the acoustic model storage unit 104; and the language model/dictionary from the sub word language model/dictionary generation unit 103, respectively, and also receives the weight value of the sub word language model from the language model weight control unit 108 at least once. Then, for each weight value of the sub word language model, the speech recognition unit 105 performs the speech recognition process on the speech data stored in the speech data storage unit 101, and obtains a syllable string as the recognition result. It should be noted that the speech recognition process can be represented by the following formula 1 and a recognition result W is obtained for speech data O as a recognition target.

$$W = \mathop{\mathrm{argmax}}_{W'}[\log P(O \mid W', \theta_{AM}) + \lambda_{LM} \log P(W' \mid \theta_{LM})] \quad (1)$$

Here, a first term and a second term in an argmax function in a right-hand side are referred to as an acoustic score and a language score, respectively. $\theta_{AM}$ is the acoustic model and stored in the acoustic model storage unit 104. $\theta_{LM}$ is the sub word language model/dictionary and generated by the sub word language model/dictionary generation unit 103. $\lambda_{LM}$ is the weight value of the sub word language model and determined by the language model weight control unit 108. W' is a candidate of a recognition result W, and one of W' is calculated as W. The argmax is a function to determine W' that gives the maximum value when the variable W' is moved.

Figure 1:
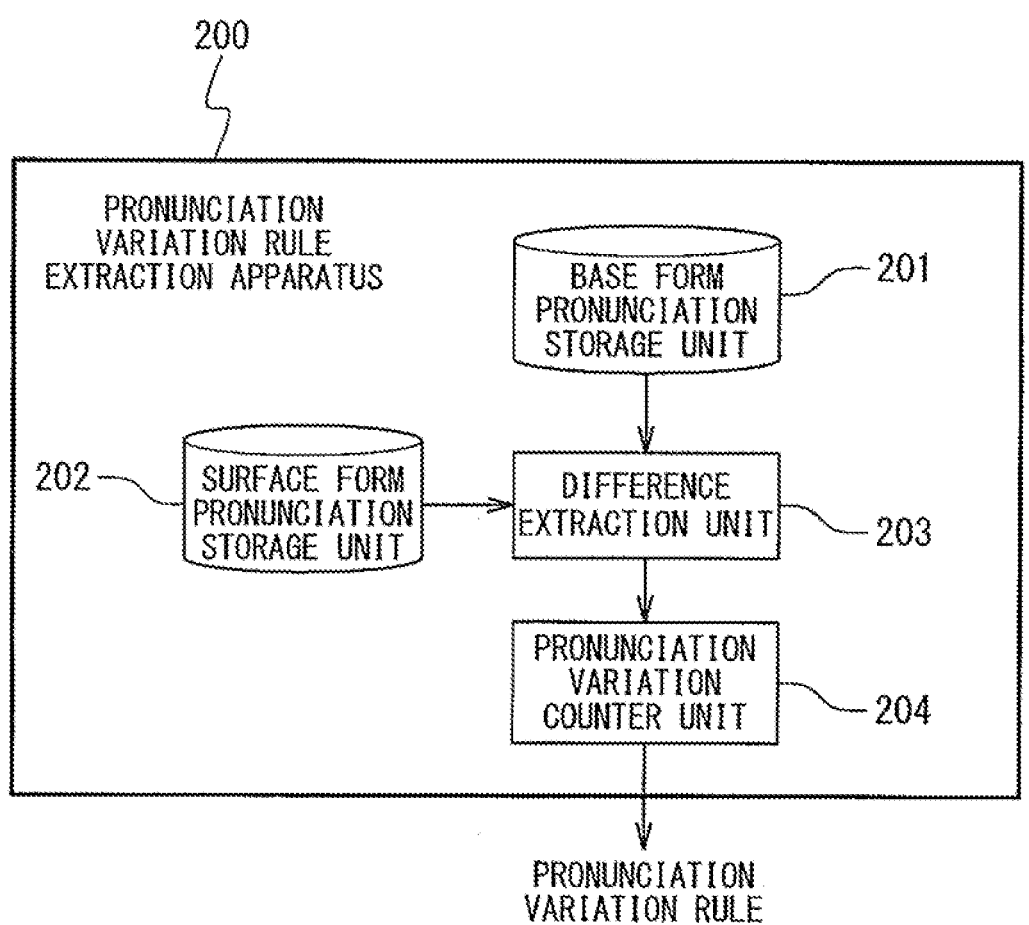
FIG. 1 is a block diagram showing an example of conventional technique.
Figure 2:
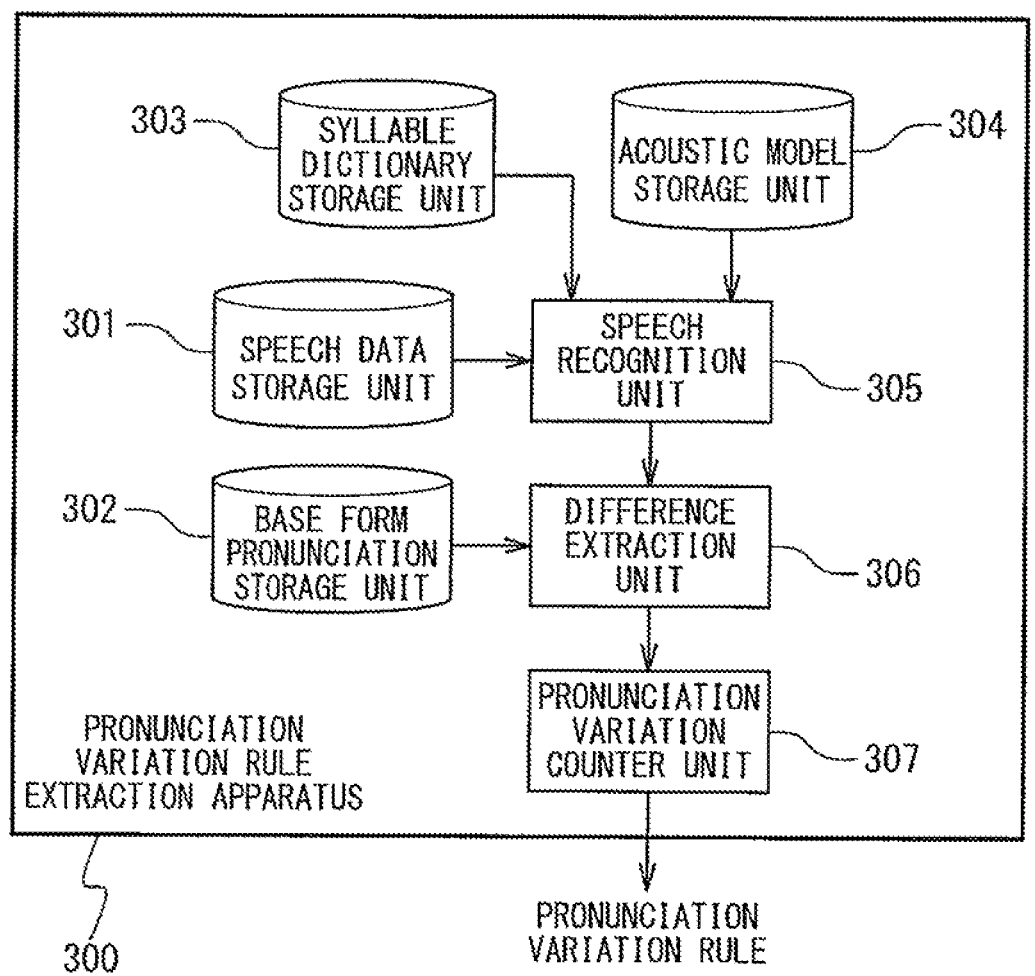
FIG. 2 is a block diagram showing an example of conventional technique.
Figure 3:
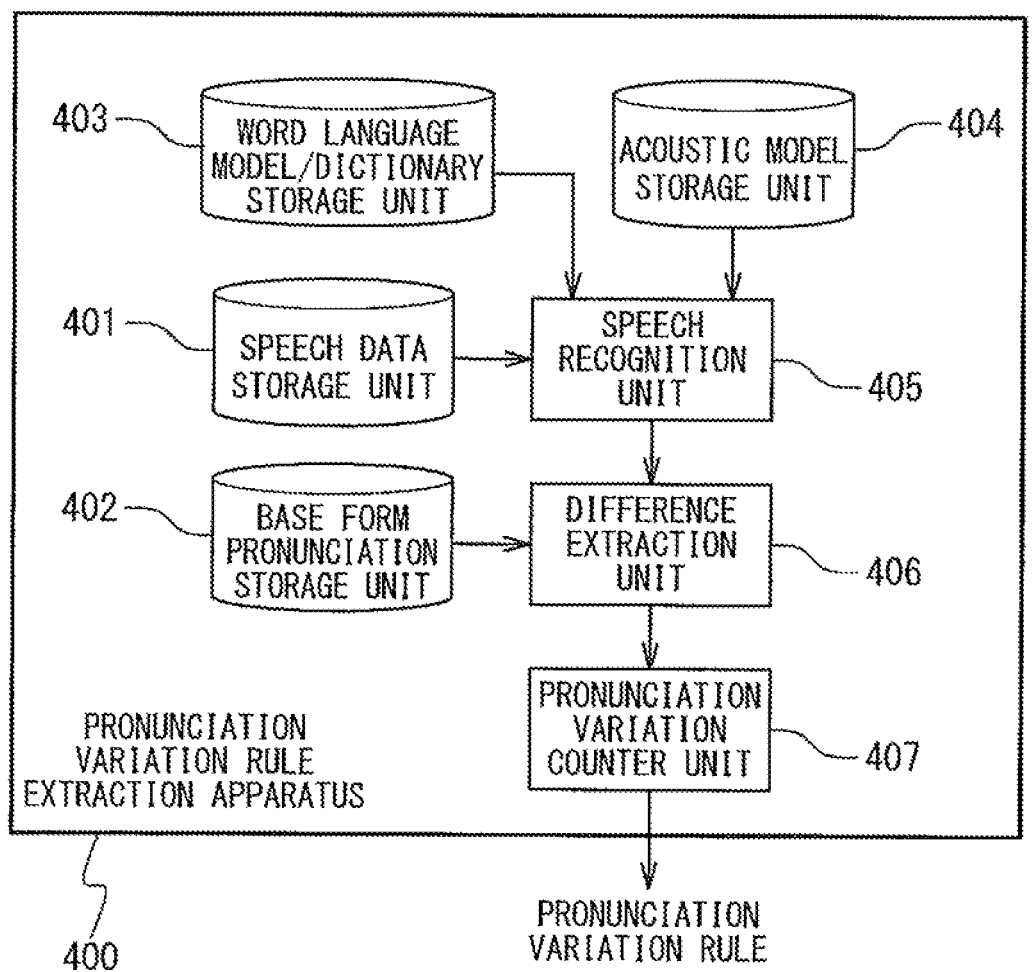
FIG. 3 is a block diagram showing an example of conventional technique.

When the weight value $\lambda_{LM}$ of the sub word language model is sufficiently large, the recognition result coincides with the transcription text used as the learning data of the sub word language model at a high probability. To the contrary, when the weight value $\lambda_{LM}$ of the sub word language model is small, the recognition result is similar to the result of the above-mentioned continuous syllable recognition, as illustrated in FIG. 2. It should be noted that, instead of setting the weight value of the sub word language model, the weight value of the acoustic model may be set. That is, instead of multiplying the term of the language score by the coefficient λLM, multiplying the term of the acoustic score by the similar coefficient leads to the same result. The increase in the weight value of the sub word language model is equal to the decrease in the weight value of the acoustic model.

The difference extraction unit 106 receives: at least one recognition result from the speech recognition unit 105; and the base form transcription text from the base form pronunciation storage unit 102, respectively, and extracts differences between them, namely, different portions. FIG. 6 shows one example of the recognition result received by the difference extraction unit 106 from the speech recognition unit 105. In this example, the recognition results respectively obtained with respect to a plurality of weight values (10.0 to 0.5) of the sub word language model are indicated. The difference extraction unit 106 compares the recognition results of FIG. 6 with the base form transcription text to extract different portions together with weight values of the sub word language model, as shown in FIG. 7. Here, each row in FIG. 7 is referred to as a pronunciation variation example.

The difference, namely, the pronunciation variation example is extracted for the word unit in this case. It should be noted that the first exemplary embodiment does not limit the setting of the unit to the word and can be executed even in another arbitrary unit. For example, in the foregoing second document, the difference extraction is executed by using a phoneme series of predetermined length as the unit. Such a format of difference extraction can be easily applied to the first exemplary embodiment.

The pronunciation variation probability estimation unit 107 receives the pronunciation variation examples from the difference extraction unit 106, classifies them with respect to base form pronunciation and surface form pronunciation, and obtains the pronunciation variation rule. As shown in FIG. 7, it is supposed that N of pronunciation variation examples such as formula 2 are obtained from the speech data stored in the speech data storage unit 101. Here, each pronunciation variation example is a set of a base form pronunciation, a surface form pronunciation and a weight value of the sub word language model.

$$\{w_i, \tilde{w}_i, \lambda_i | i=1, 2, \ldots, N\} \quad (2)$$

When it is considered that a surface form pronunciation, which is observed even in a case that the weight value of the sub word language model is large and the linguistic constraint is strong, may have a tendency to appear in general, the pronunciation variation rule in which the base form pronunciation w is given is defined as formula 3 based on probability theory.

$$P(\tilde{w} | w) = \frac{\sum_i \lambda_i \delta_{w, w_i} \delta_{\tilde{w}, \tilde{w}_i}}{\sum_i \lambda_i \delta_{w, w_i}} \quad (3)$$

Here, δi, j is a Kronecker's delta (1 when i=j, and 0 when not so). Alternatively, as a modified example of the formula 3, without considering the weight value λi of the sub word language model, the calculation may be executed by replacing λi with 1. Or, λi of the equation 3 may be replaced with a function of λi as a variable, for example, a polynomial function of λi. Moreover, when the probability value of the equation 3 is calculated, a proper smoothing operation may be executed. The proper smoothing operation corresponds to, for example, an operation such as ignorance of the pronunciation variation example in which the weight value of the sub word language model is small, or ignorance of the pronunciation variation example for which the number of the observations is equal to or smaller than a predetermined value.

Figure 8:
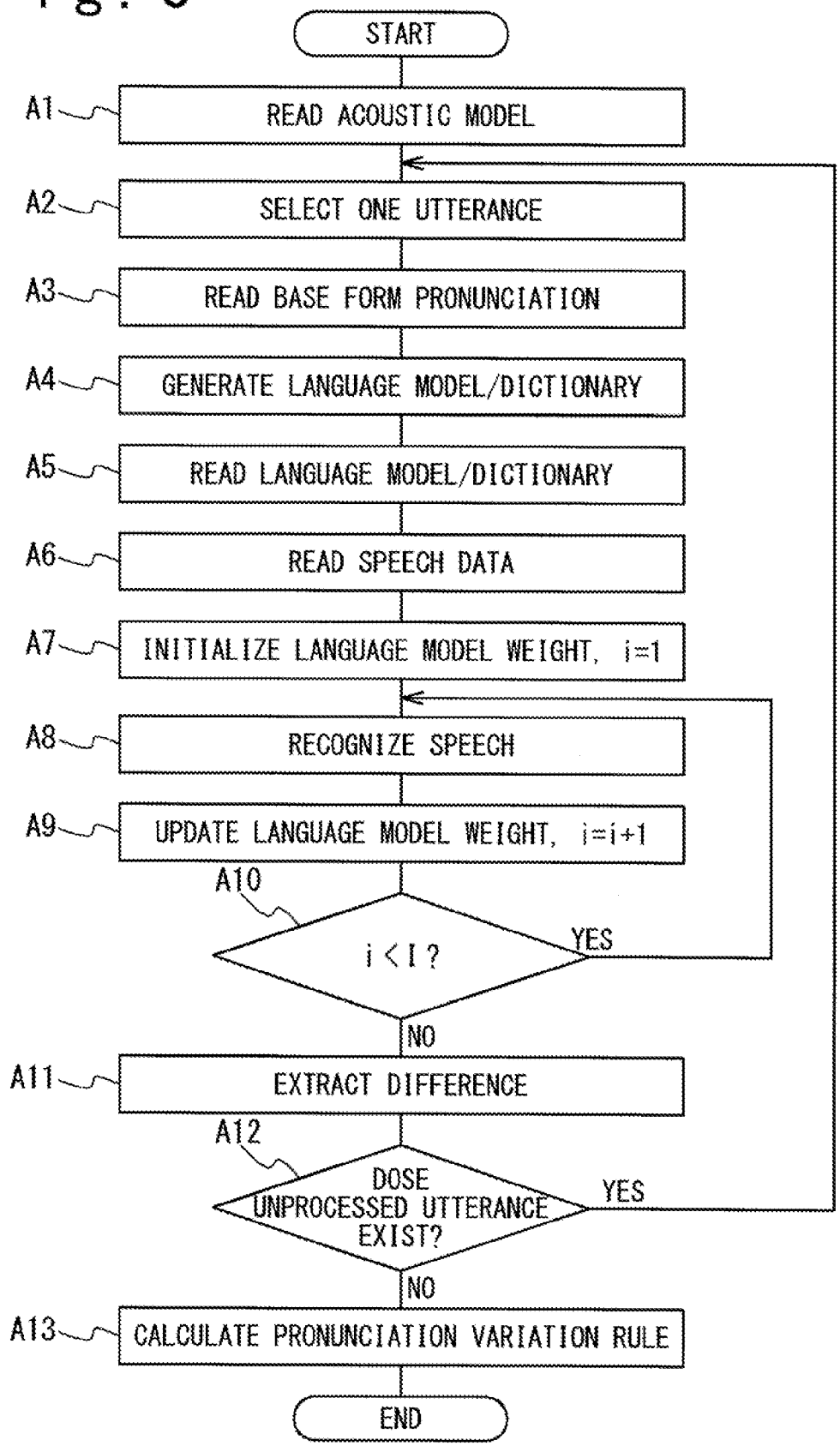
FIG. 8 is a flowchart illustrating operation according to the first exemplary embodiment of the present invention.

Next, referring to the block diagram of FIG. 4 and the flowchart of FIG. 8, the operation in the first exemplary embodiment will be described below in detail. At first, the speech recognition unit 105 reads the acoustic model from the acoustic model storage unit 104 (Step A1 in FIG. 8). Next, the sub word language model/dictionary generation unit 103 selects the transcription text of one utterance stored in the base form pronunciation storage unit 102 (Step A2), reads the selected transcription text (Step A3), generates the sub word language model by using the selected transcription text as learning data, and generates the dictionary as necessary (Step A4). The speech recognition unit 105 reads the sub word language model/dictionary generated by the sub word language model/dictionary generation unit 103 (Step A5). Next, the speech recognition unit 105 reads the speech data corresponding to the transcription text selected at the step A2, from the speech data storage unit 101 (Step A6).

The language model weight control unit 108 sets a predetermined value, for example, a sufficiently large value, as the weight value of the sub word language model and sends the value to the speech recognition unit 105 (Step A7). The speech recognition unit 105 carries out the speech recognition process based on the weight value of the sub word language model set by the language model weight control unit 108, and stores the speech recognition result, namely, the syllable string, and the weight value of the sub word language model (Step A8). The language model weight control unit 108 updates the weight value of the sub word language model by increasing or decreasing the weight value of the sub word language model by a constant value (Step A9). If the number of times of the update of the weight value of the sub word language model is larger than a predetermined number I, the operation proceeds to the next step, and if not so, the above steps A8 and A9 are repeated (Step A10). The difference extraction unit 106 receives the results of the speech recognition process executed by the speech recognition unit 105, in the format already shown in FIG. 6, and receives the base form transcription text which is selected by the sub word language model/dictionary generation unit 103 at the step A3. Then, in the format already shown in FIG. 7 and the equation 2, the difference extraction unit 106 extracts the different portions between them, namely, pronunciation variation examples (Step A11). The foregoing processes of the steps A2 to A11 are repeated until unprocessed utterance does not exist (Step A12). Finally, the pronunciation variation probability estimation unit 107 integrates all of the pronunciation variation examples obtained by the difference extraction unit 106 in accordance with the equation 3 and outputs the result of integration as the pronunciation variation rule (Step A13).

It should be noted that it is possible to apply another speech recognition unit that slightly differs from the speech recognition unit 105 in the first exemplary embodiment. The other speech recognition unit stores a non-informative sub word language model in a storage unit (not shown). Here, "non-informative" means that respective words can appear at the equal probability in arbitrary history. The non-informative sub word language model is, when the sub word is syllable, a model in which P(si|si−2, si−1)=const is represented for si−2, si−1 and si as an arbitrary array of syllables. When the non-informative sub word language model is used, the speech recognition process is represented by formula 4, instead of formula 1.

$$W = \underset{W'}{\mathrm{argmax}}[\log P(O \mid W', \theta_{AM}) + \qquad (4)$$
$$K\log\{(1 - \lambda_{LM})P(W' \mid \theta_{LM0}) + \lambda_{LM}P(W' \mid \theta_{LM})\}]$$

Here, θLM0 indicates the non-informative sub word language model and K is a predetermined constant (K may be omitted). Even when the equation 4 is used, the language model weight control unit 108 increases or decreases the weight value λLM of the sub word language model, and thus the other speech recognition unit can obtain results similar to those in the case of the speech recognition unit 105 in the first exemplary embodiment. However, in this case, a constraint that λLM is equal to or larger than 0 and is equal to or smaller than 1 is imposed on the weight value of the sub word language model. Hence, the language model weight control unit 108 is operated to determine the weight value of the sub word language model under this constraint.

Moreover, modified examples that slightly differ from the first exemplary embodiment can be applied to the operations of the speech recognition unit 105, the difference extraction unit 106 and the language model weight control unit 108. That is, although the steps A8, A9 and A10 in FIG. 8 are repeated for the predetermined number of times in the first exemplary embodiment, the number of times of repetition can be adaptively determined based on the extraction result by a difference extraction unit according to the modified example.

For example, in a case that a sufficiently large value is set as the initial value of the weight value of the sub word language model at the step A7 and that the operation is carried out to sequentially decrease the weight value of the sub word language model at the step A9, the repetition is stopped when the difference between the base form pronunciation and the recognition result extracted by the difference extraction unit becomes larger than a predetermined threshold. Here, in order to quantitatively determine the difference between the base form pronunciation and the recognition result, for example, it is possible to use an editing distance that is known as a typical scale of degree of difference between letter strings.

Or, to the contrary, in a case that a sufficiently small value is set as the initial value of the weight value of the sub word language model at the step A7 and that the operation is carried out to sequentially increase the weight value of the sub word language model at the step A9, the repetition is stopped when the difference between the base form pronunciation and the recognition result extracted by the difference extraction unit becomes smaller than a predetermined threshold or when the base form pronunciation and the recognition result completely coincide with each other.

Next, advantages of the first exemplary embodiment will be described. In the first exemplary embodiment, there provided are the sub word language model/dictionary generation unit 103 configured to generate the sub word language model which can accept only the base form pronunciation; the language model weight control unit 108 configured to determine the weight of the sub word language model, namely, the weight value of the sub word language model; the speech recognition unit 105 configured to recognize the speech data corresponding to the base form pronunciation by using the sub word language model and the weight value thereof; the difference extraction unit 106 configured to extract the different portions as the pronunciation variation examples by comparing the recognition result, which is outputted by the speech recognition unit 105, with the base form pronunciation; and the pronunciation variation probability estimation unit 107 configured to integrate the pronunciation variation examples to output the pronunciation variation rule. Here, the results obtained by executing the speech recognition process based on the several weight values of the sub word language model are respectively compared with the base form pronunciation, the differences are extracted as the pronunciation variation examples, and the pronunciation variation examples are integrated in consideration of the weight values of the sub word language model. Therefore, the pronunciation variation rule can be obtained which is accurate, has a high generalization property and is provided with the probability values corresponding to the tendencies of appearance.

Figure 9:
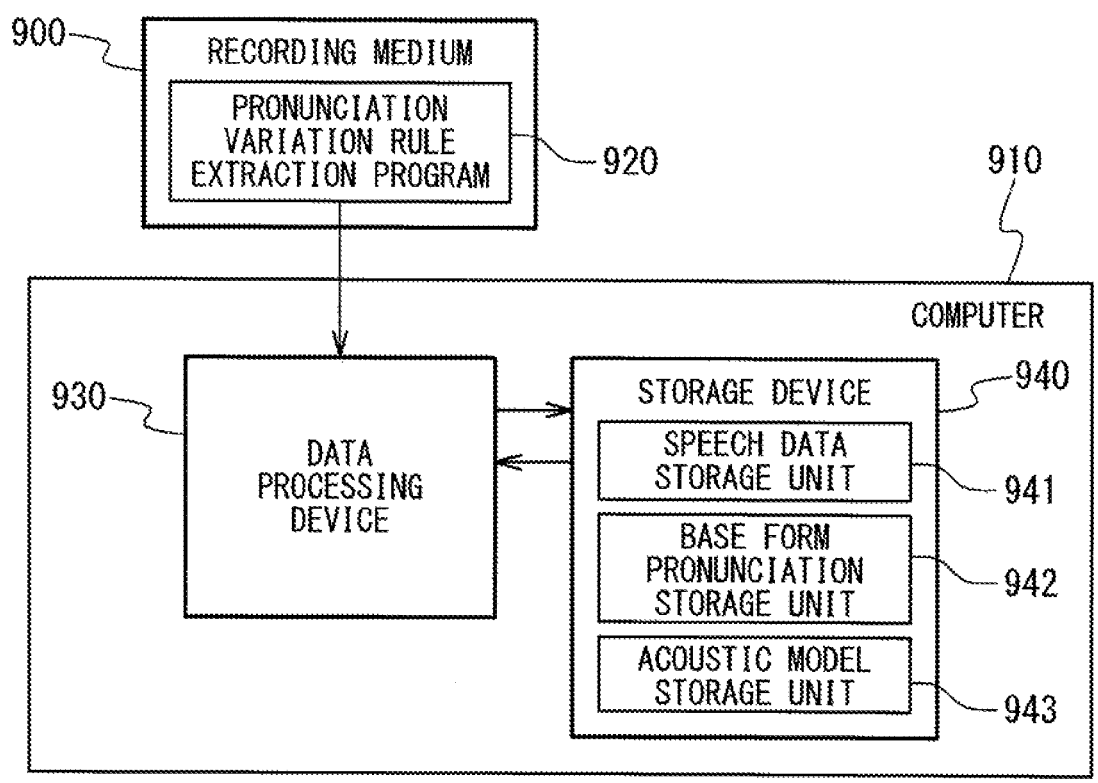
FIG. 9 is a block diagram showing a configuration according to a second exemplary embodiment of the present invention.

Next, a second exemplary embodiment of the present invention will be described below in detail with reference to the drawings. The second exemplary embodiment implements the first exemplary embodiment by using a program. This program causes a computer to function as the combination of the units 101 to 108 in the first exemplary embodiment. With reference to FIG. 9, a pronunciation variation rule extraction program 92 is stored in a computer-readable recording medium 90, is read by a computer 91 and controls the operation of the computer 91.

When the pronunciation variation rule extraction program 92 is read by the computer 91 and then started, a speech data storage unit 941 in a storage device 94 is caused to function as the speech data storage unit 101, a base form pronunciation storage unit 942 is caused to function as the base form pronunciation storage unit 102, and an acoustic model storage unit 943 is caused to function as the acoustic model storage unit 104. Moreover, a data processing device 93 is controlled based on the pronunciation variation rule extraction program 92 to function as the sub word language model/dictionary generation unit 103, the speech recognition unit 105, the difference extraction unit 106, the pronunciation variation probability estimation unit 107 and the language model weight control unit 108 in the first exemplary embodiment. The data processing device processes the data stored in the speech data storage 941 unit, the base form pronunciation storage unit 942 and the acoustic model storage unit 943 in the storing device 94 to output the pronunciation variation rule.

The present invention can be applied to a field such as a pronunciation variation rule extraction apparatus for extracting a pronunciation variation rule from large scale speech data and a program for implementing the pronunciation variation rule extraction apparatus in a computer. There is known a speech recognition apparatus which is widely used for information input, information retrieval, transcription support, image indexing, and the like. The present invention can be applied to a field such as a speech recognition model generation apparatus which generates an acoustic model or a language model to be used by such speech recognition apparatus such that the acoustic model or the language model is robust against pronunciation variations. The present invention can be applied to a field such as a pronunciation training apparatus and a language learning apparatus.

Although the present invention has been described above in connection with the exemplary embodiments thereof, the present invention is not limited to the above exemplary embodiments. Those skilled in the art can apply various modifications and changes to the configurations and details of the present invention within the scope of the present invention.

The invention claimed is:

1. A pronunciation variation rule extraction apparatus comprising:
    a speech data storage unit which stores speech data;
    a base form pronunciation storage unit which stores base form pronunciation data representing base form pronunciation of said speech data;
    a sub word language model generation unit which generates a sub word language model from said base form pronunciation data;
    a speech recognition unit which recognizes said speech data by using said sub word language model;
    a difference extraction unit which extracts a difference between a recognition result outputted from said speech recognition unit and said base form pronunciation data by comparing said recognition result and said base form pronunciation data; and
    a language model weight control unit which controls one weight value for said sub word language model,
    wherein said language model weight control unit outputs a plurality of said weight values,
    wherein said speech recognition unit recognizes said speech data for each of said plurality of weight values, and
    wherein said language model weight control unit determines whether or not said weight value should be updated, based on said difference when said difference is extracted.

2. The pronunciation variation rule extraction apparatus according to claim 1, wherein, when said difference is smaller than a predetermined threshold, said language model weight control unit updates said weight value such that said weight value is decreased.

3. The pronunciation variation rule extraction apparatus according to claim 1, wherein when said difference is larger than a predetermined threshold, said language model weight control unit updates said weight value such that said weight value is increased.

4. The pronunciation variation rule extraction apparatus according to claim 1, wherein said difference extraction unit calculates said difference as an editing distance between said recognition result and said base form pronunciation data.

5. The pronunciation variation rule extraction apparatus according to claim 1, wherein said difference extraction unit extracts as said difference, a pronunciation variation example including a letter string pair of different portions between said recognition result and said base form pronunciation data and the weight value of said sub word language model received from said language model weight control unit by said speech recognition unit at a time of acquisition of said recognition result.

6. The pronunciation variation rule extraction apparatus according to claim 5, further comprising a pronunciation variation probability estimation unit which generates a probability rule of pronunciation variation from said pronunciation variation example.

7. The pronunciation variation rule extraction apparatus according to claim 6, wherein said pronunciation variation probability estimation unit generates said probability rule of said pronunciation variation based on a magnitude of the weight value of said sub word language model upon observation of said pronunciation variation example such that said pronunciation variation example has a high appearance probability.

8. A pronunciation variation rule extraction method comprising:
    storing base form pronunciation data representing base form pronunciation of speech data;
    generating a sub word language model from said base form pronunciation data;
    recognizing said speech data by using said sub word language model;
    extracting a difference between a recognition result of said recognizing and said base form pronunciation data by comparing said recognition result and said base form pronunciation data; and
    controlling one weight value for said sub word language model,
    wherein said controlling includes outputting a plurality of said weight values,
    wherein said recognizing includes recognizing said speech data for each of said plurality of weight values, and
    wherein said controlling further includes determining whether or not said weight value should be updated, based on said difference when said difference is extracted.

9. The pronunciation variation rule extraction method according to claim 8, wherein said controlling further includes updating said weight value, when said difference is smaller than a predetermined threshold, such that said weight value is decreased.

10. The pronunciation variation rule extraction method according to claim 8, wherein said controlling further includes updating said weight value, when said difference is larger than a predetermined threshold, such that said weight value is increased.

11. The pronunciation variation rule extraction method according to claim 8, wherein said extracting includes:
    calculating said difference as an editing distance between said recognition result and said base form pronunciation data; and
    extracting as said difference, a pronunciation variation example including a letter string pair of different portions between said recognition result and said base form pronunciation data and said weight value of said sub word language model received upon acquisition of said recognition result.

12. The pronunciation variation rule extraction method according to claim 11, further comprising generating a probability rule of pronunciation variation from said pronunciation variation example,
    wherein said generating said probability rule includes generating said probability rule of said pronunciation variation based on a magnitude of said weight value of said sub word language model upon observation of said pronunciation variation example, such that said pronunciation variation example has a high appearance probability.

13. A non-transitory computer-readable recording medium which records a pronunciation variation rule extraction program which causes a computer to function as:
    a speech data storage unit which stores speech data;
    a base form pronunciation storage unit which stores base form pronunciation data representing base form pronunciation of said speech data;
    a sub word language model generation unit which generates a sub word language model from said base form pronunciation data;
    a speech recognition unit which recognizes said speech data by using said sub word language model;
    a difference extraction unit which extracts a difference between a recognition result outputted from said speech recognition unit and said base form pronunciation data by comparing said recognition result and said base form pronunciation data; and a language model weight control unit which controls one weight value for said sub word language model, wherein said language model weight control unit outputs a plurality of said weight values, wherein said speech recognition unit recognizes said speech data for each of said plurality of weight values, and wherein said language model weight control unit determines whether or not said weight value should be updated, based on said difference when said difference is extracted.

14. The non-transitory computer-readable recording medium according to claim 13, wherein said language model weight control unit updates said weight value such that said weight value is decreased when said difference is smaller than a predetermined threshold.

15. The non-transitory computer-readable recording medium according to claim 13, wherein said language model weight control unit updates said weight value such that said weight value is increased when said difference is larger than a predetermined threshold.

16. The non-transitory computer-readable recording medium according to claim 13, wherein said difference extraction unit calculates said difference as an editing distance between said recognition result and said base form pronunciation data, and extracts as said difference, a pronunciation variation example including letter string pair of different portions between said recognition result and said base form pronunciation data and said weight value of said sub word language model received from said language model weight control unit by said speech recognition unit upon acquisition of said recognition result, wherein said program further causes said computer to function as a pronunciation variation probability estimation unit which generates a probability rule of pronunciation variation from said pronunciation variation example, wherein said pronunciation variation probability estimation unit generates said probability rule of said pronunciation variation based on a magnitude of said weight value of said sub word language model upon observation of said pronunciation variation example, such that said pronunciation variation example has a high appearance probability.

* * * * *